W. P. SHATTUCK.
GRIP TREAD FOR PNEUMATIC TIRES.
APPLICATION FILED JAN. 17, 1907.

913,674.

Patented Feb. 23, 1909.

WITNESSES

INVENTOR
WILLIAM P. SHATTUCK
BY Paul & Paul
HIS ATTORNEYS

UNITED STATES PATENT OFFICE.

WILLIAM P. SHATTUCK, OF MINNEAPOLIS, MINNESOTA, ASSIGNOR OF ONE-HALF TO MARTIN McVOY, JR., OF NEW YORK, N. Y.

GRIP-TREAD FOR PNEUMATIC TIRES.

No. 913,674.  Specification of Letters Patent.  Patented Feb. 23, 1909.

Application filed January 17, 1907. Serial No. 352,681.

*To all whom it may concern:*

Be it known that I, WILLIAM P. SHATTUCK, of Minneapolis, Hennepin county, Minnesota, have invented certain new and useful Improvements in Grip-Treads for Pneumatic Tires, of which the following is a specification.

This invention relates to wheel tires and particularly to grip treads therefor.

The object of the invention is to provide a grip device of economical construction and easily applied to the wheel or removed and very durable.

A further object is to provide a grip device that will fit snugly on the tire at all times and do away with the flapping of the loose parts usually incident to devices of this kind.

Other objects of the invention will appear from the following detailed description.

The invention consists generally in a flexible grip formed into a series of loops extending continuously around the periphery of the tire and from side to side thereon and means separably connecting the contiguous loops.

Further, the invention consists in an automatic take up device whereby the slack in the grip will be taken up.

Further, the invention consists in various constructions and combinations, all as hereinafter described and particularly pointed out in the claims.

Figure 1:
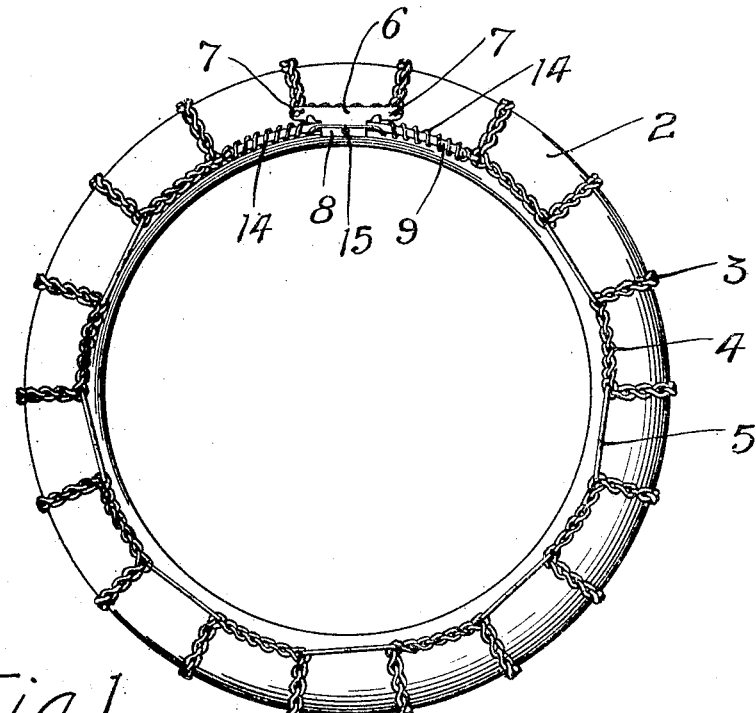
Figure 2:
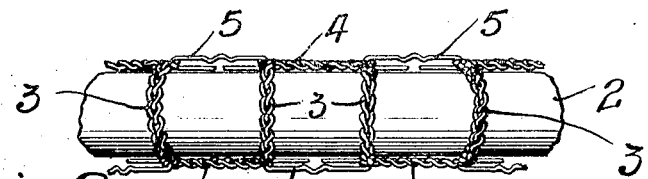
Figure 3:
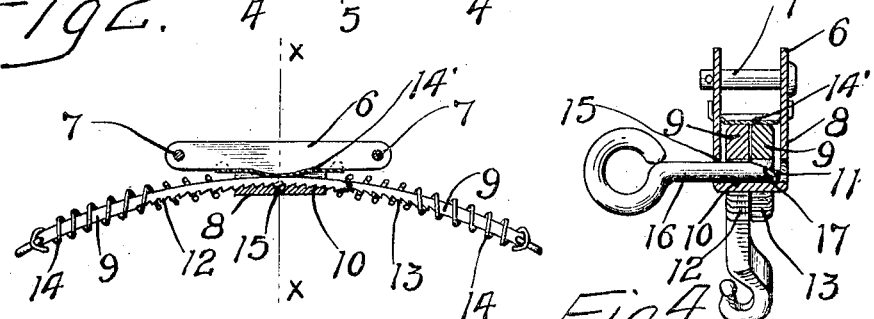
Figure 4:
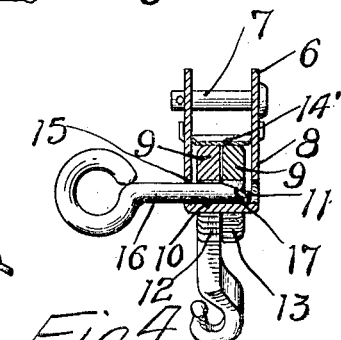

In the accompanying drawings, forming part of this specification, Figure 1 is a side elevation of a pneumatic tire with my improved grip tread applied thereto. Fig. 2 is a top view of the same showing only a portion of the tire. Fig. 3 is a detail sectional view illustrating the take up device. Fig. 4 is a sectional view on the line $x$—$x$ of Fig. 3.

In the drawing, 2 represents an ordinary tire such as is usually used on automobiles and of any suitable size. Grip treads as heretofore made for the purpose of preventing the tire from slipping or skidding on slippery pavements or frozen ground or in the mud, consist of side chains arranged on each side of the wheel rim and connected at intervals across the periphery of the tire by comparatively short cross chains. These short chains are subjected to the wear as they form the tread of the grip and as the chains are made of soft metal the tread of the grip wears out in a comparatively short time, particularly when used on rough frozen ground.

No provision, so far as I am aware, has ever been made for changing the position of the grip to present new wearing surfaces for the tread.

The important feature of my invention lies in a tread consisting of a single continuous length of flexible material, preferably a chain of suitable size formed into a series of loops 3 with continuous sections 4 connecting them alternating with separable links 5 on both sides of the tire. To avoid loose flapping ends the chain or other flexible means is made continuous, but it may be separated at the point where the take up device is inserted if preferred. The loops extend across the tire and form the grip tread therefor, and whenever desired the separable links 5 may be detached and the grip relaid on the tire, so that new loops will be formed and new unworn surfaces presented to the tread. I am thus able to utilize the entire length of the chain for wearing surfaces and greatly prolong the life of the device. The separable links are preferably made as indicated, of wire of suitable size and capable of being readily unhooked from the loops. Any other suitable form of link, however, may be used in place of those shown, my purpose being to provide merely some detachable means between the loops which will permit readjustment of the tread.

In devices of this kind as usually used, there are more or less loose flapping parts due to the wear and stretching of the chain, and for the purpose of avoiding the annoyance and objection of having the grip tread work loose on the tire, I provide an automatic take-up arrangement consisting preferably of a plate 6 detachably connected at 7 to the contiguous loops of the tread and having a housing 8 wherein rods 9 that are attached to the tread are slidable, one rod moving in one direction and the other in the other. The bottom of the housing is provided with a series of ratchet teeth 10 on one side of the center and with a corresponding series of oppositely formed ratchet teeth 11 on the other side of the center. The rods 9 have teeth 12 and 13 respectively adapted to engage the teeth 10 and 11 sliding over them freely in one direction and interlocking therewith and preventing movement in the other direction. Coiled springs 14 are provided on the said rods and normally tend to draw the rods into the housing past one another and tighten the grip on the tire taking up all slack therein. As fast as the slack is taken up the interlocking teeth will hold it and prevent the grip from working loose. A socket 15 is provided in the side walls of the housing adapted to receive a key 16 having a tapered end 17 which when inserted beneath the toothed ends of the rods will lift them against the tension of a flat spring 14' out of engagement with the teeth and permit their separation and loosen the grip on the tire and permit its convenient removal. This take up device may be inserted at any point on the periphery of the tire and as heretofore stated it may be used to connect the separated ends of the chain or other flexible means, or it may be used as indicated in Fig. 1, between two transverse sections of contiguous loops. I do not wish to confine myself to the specific construction of this take up device, as it is capable of various modifications all within the scope of my invention.

It will be noted that while this grip device is continuous extending around the tire and from side to side of its periphery, that it is nevertheless free to creep on the tire or change its position while in use to avoid undue wear of the tire in one spot. By simply inserting a key and releasing the take up the grip can be easily and quickly removed from the tire and as readily placed thereon.

I claim as my invention:

1. A grip tread for wheel tires comprising a flexible means formed into a series of loops and adapted to extend across the tire from side to side and continuously around the periphery thereof, and means separably connecting contiguous loops with one another, whereby the position of the loops in said flexible means may be changed to present new wearing surfaces for the tread.

2. A grip tread for wheel tires comprising a chain formed into a series of continuous loops adapted to extend transversely on the periphery of a tire and continuously around the same, and means separably connecting contiguous loops with one another, whereby their position in the chain may be changed to present new wearing surfaces for the tread.

3. A grip tread for wheel tires comprising a flexible means formed into a series of loops and adapted to lie transversely on the periphery of the tire and extending continuously around the same, and metallic links connecting contiguous loops at the sides of the tire and being detachable therefrom, whereby new loops may be formed in the said flexible means and new surfaces presented to the tread.

4. A grip tread for wheel tires comprising a flexible means formed into a series of loops and adapted to encircle a tire, and a take up device inserted into said flexible means between contiguous loops and arranged to automatically draw up and tighten the grip tread on the tire, substantially as described.

5. A grip tread for wheel tires comprising a flexible means formed in continuous loops extending transversely of the periphery of the tire and continuously around the same, and a take up device inserted into said flexible means and arranged to automatically take up the slack and tighten the grip tread, for the purpose specified.

6. A grip tread for wheel tires comprising a flexible means adapted to encircle a tire, and a take up device inserted into said flexible means, and said take up device comprising springs normally tending to tighten said grip tread on the tire with means for locking it as fast as tightened, substantially as described.

7. A grip tread for wheel tires comprising a flexible means adapted to encircle a tire, a take up device inserted into said flexible means and normally tending to draw up the slack and lock the tread in its tightened position, said take up device having means for releasing or tripping the locking mechanism to allow the tread to become slack, substantially as described.

8. A grip tread for wheel tires comprising a flexible means adapted to encircle a tire, a take up device inserted into said flexible means and comprising a housing having oppositely formed teeth, and rods connected at one end to said flexible means and having oppositely formed teeth on their other ends to engage the teeth of said housing, and springs coiled on said rods and normally tending to draw them together to tighten the said flexible mean, substantially as described.

9. A grip tread for wheel tires comprising a flexible means adapted to encircle a tire, and a take up device inserted into said flexible means and consisting of a housing having oppositely arranged teeth and rods connected at one end of said flexible means and slidable in said housing and having oppositely formed teeth to engage the teeth of said housing, a spring device for holding said rod teeth in engagement with said housing teeth, springs mounted on said rods and normally tending to draw them together, and said housing having a socket to receive a key for separating the teeth of said rods from the teeth of said housing, for the purpose specified.

10. A grip tread for wheel tires comprising a chain formed in a series of continuous loops adapted to lie transversely on the periphery of the tire, and to encircle the same, means connecting contiguous loops with one another, and a take up device also connecting contiguous loops and comprising a housing having oppositely formed teeth and rods attached to said loops and having ends provided with oppositely formed teeth adapted to slide in said housing and engage the teeth thereof, aad thereby lock the said chain in its tightened position on the tire, and springs coiled on said rods and normally tending to draw them together.

In witness whereof, I have hereunto set my hand this 12th day of January 1907.

WILLIAM P. SHATTUCK.

Witnesses:
RICHARD PAUL,
J. B. ERA.